Patented Dec. 8, 1936

2,063,461

UNITED STATES PATENT OFFICE 2,063,461

ISOTHIOUREA-ISOPROPYLETHER

Bruno Puetzer, Albany, N. Y., assignor to Winthrop Chemical Company, Inc., New York, N. Y., a corporation of New York No Drawing. Application May 21, 1935, Serial No. 22,650. In Germany May 29, 1934

1 Claim. (Cl. 260—125)

This invention relates to a thiourea derivative and to a process of manufacturing the same.

In accordance with the present invention a medium inciting the respiratory activity and increasing the blood pressure can be obtained by the manufacture of the isopropylether of isothiourea or of the salts thereof. The isopropyl-isothiourea ether is distinguished from other alkyl-isothiourea ethers by simultaneously exerting the two pharmacological actions referred to above, whereas other alkyl-thiourea ethers contrary thereto decrease the blood pressure or exert undesirable pharmacological actions. Isopropyl-isothiourea ether forms salts with acids which, in general, are soluble in water.

In accordance with the present invention the isopropyl-isothiourea ether is obtained by reacting a reactive ester of isopropylalcohol, for instance, its esters with hydrohalic acids or with sulfuric acid or substitution products of sulfuric acid, nitric or thiocyanic acid upon thiourea or its salts. The reaction is carried out in the presence of a solvent, such as alcohol, while heating. Salts of the isopropyl-isothiourea are thus obtained. The free base is a relatively unstable compound. The salts of the base may be transformed into other salts by the customary double decomposition method.

In accordance with the present invention it has further been found that the isopropyl-isothiourea ether may be prepared by reacting isopropyl-mercaptane and cyanamide, isourea- or isothiourea ether or salts of these compounds with one another. Also in this case the reaction is preferably carried out in the presence of a solvent, such as alcohol.

The invention is further illustrated by the following examples without being restricted thereto:

*Example 1.*—25 grams of isopropylbromide, 16 grams of thiourea and 10 ccs. of dry alcohol are heated to boiling under reflux for about 12 hours. The alcohol is then removed under reduced pressure. The residue crystallizes after some standing. The crystals are treated with ether, filtered with suction and recrystallized from acetone-acetic ester. The isopropyl-isothiourea-ether-hydrobromide obtained melts at 77° C. On increasing the quantity of isopropylbromide the thiourea can be converted quantitatively into its isopropyl-isothiourea-ether.

The isopropyl-isothiourea-ether in the form of its sulfate is obtained by dissolving 15.2 grams of thiourea in 7.6 grams of concentrated sulfuric acid, boiling the mixture with 100 ccs. of isopropylalcohol for a prolonged time, for instance, 40 hours under reflux and evaporating the alcohol in vacuo. The picrate melts at 190° C. When not sufficiently long heating part of the thiourea is recovered.

A similar reaction performs when using thiourea-hydrochloride.

*Example 2.*—55 grams of isopropyl-iodide, 35 ccs. of alcohol and 22.8 grams of finely powdered thiourea are heated to boiling for several hours. The mixture is then freed from alcohol and excess isopropyl-iodide in vacuo. The remaining oil crystallizes after inoculation with crystals and is washed with absolute alcohol. The isopropyl-isothiourea-ether-hydroiodide is obtained in weakly yellowish hygroscopic crystals melting at 69° C. The product is obtained in an almost quantitative yield.

*Example 3.*—4.3 grams of isopropyl-mercaptane, 1.05 grams of cyanamide, 5 grams of cyanamide-dihydrobromide are first heated in a pressure tube at gradually increasing temperature and then for some hours on the water-bath. The light, viscous separation is several times washed with ether, dissolved in acetone and completely evaporated to dryness in vacuo. The hydrobromide crystallizes after inoculation with crystals and is purified as indicated in Example 1. The aqueous solution on the addition of picric acid yields long yellow needles of the picrate melting at 190° C.

The salts of the isopropyl-thiourea-ether may be transformed into other salts by double decomposition, for instance, by reacting upon the isopropyl-isothiourea-hydrobromide with silver acetate. After separation of the silver bromide the acetate is obtainable in the form of white crystals melting at 159° C. which are readily soluble in water and alcohols but insoluble in ether and acetic acid ester, and sparingly soluble in acetone and chloroform. When using instead of silver acetate silver methane sulfonate the methane sulfonate of the isopropyl-isothiourea-ether is obtained as a product which is readily soluble in water. A salt which is relatively readily soluble in water and methanol but sparingly soluble in ethanol and acetone, and almost insoluble in ether and chloroform is obtained by preparing the salt from one mol. of naphthalene-1.5-dissulfonic acid with two mols of isopropyl-isothiourea-ether. It forms white crystals which decompose at 245° C.

A salt which is difficultly soluble in water, ethanol and acetone is obtained when reacting upon the sodium salt of 2.2'-methylenedioxy-dinaphthalene-3.3'-dicarboxylic acid with two mols of for instance isopropyl-isothiourea-ether-hydrobromide. The salt forms yellow crystals which decompose at 216° C.

I claim:—

Isothiourea-isopropylether, which compound is in the form of its salts with acids in general soluble in water, its hydrobromide melting at 77° C., its picrate melting at 190° C.

BRUNO PUETZER.